United States Patent
Gallet et al.

(10) Patent No.: US 9,145,847 B2
(45) Date of Patent: Sep. 29, 2015

(54) MECHANICAL TRANSMISSION DEVICE FOR DRIVING IN ROTATION COUNTER-ROTATING PROPELLERS OF A DUAL-PROPELLER TURBOPROP

(75) Inventors: Francois Gallet, Paris (FR); Ivan Guy Rouesne, Combs la Ville (FR)

(73) Assignee: SNECMA, Paris (FR)

( * ) Notice: Subject to any disclaimer, the term of this patent is extended or adjusted under 35 U.S.C. 154(b) by 638 days.

(21) Appl. No.: 13/585,331

(22) Filed: Aug. 14, 2012

(65) Prior Publication Data

US 2013/0045102 A1 Feb. 21, 2013

(30) Foreign Application Priority Data

Aug. 18, 2011 (FR) .................................... 11 57401

(51) Int. Cl.
| | |
|---|---|
| *F02K 3/062* | (2006.01) |
| *B64C 11/48* | (2006.01) |
| *F02C 3/067* | (2006.01) |
| *F02C 7/36* | (2006.01) |
| *B64D 35/06* | (2006.01) |
| *B64C 11/30* | (2006.01) |
| *B64D 27/00* | (2006.01) |

(52) U.S. Cl.
CPC ............... *F02K 3/062* (2013.01); *B64C 11/308* (2013.01); *B64C 11/48* (2013.01); *B64D 35/06* (2013.01); *F02C 3/067* (2013.01); *F02C 7/36* (2013.01); *B64D 2027/005* (2013.01); *F05D 2260/40311* (2013.01); *Y02T 50/66* (2013.01); *Y02T 50/671* (2013.01)

(58) Field of Classification Search
CPC ....... F02K 3/062; B64C 11/308; B64C 11/48; B64D 35/06; B64D 2027/005; F02C 3/067; F02C 7/36; Y02T 50/66; Y02T 50/671; F05D 2260/40311

USPC .......................................................... 416/129
See application file for complete search history.

(56) References Cited

U.S. PATENT DOCUMENTS

| | | | | |
|---|---|---|---|---|
| 5,433,674 | A * | 7/1995 | Sheridan et al. | 475/346 |
| 2010/0150702 | A1 | 6/2010 | Sheridan et al. | |
| 2011/0243735 | A1 | 10/2011 | Balk et al. | |
| 2011/0299974 | A1 | 12/2011 | Gauthier et al. | |

FOREIGN PATENT DOCUMENTS

| | | |
|---|---|---|
| WO | WO 2010/070066 A1 | 6/2010 |
| WO | WO 2010/092263 A1 | 8/2010 |
| WO | WO 2010/102995 A1 | 9/2010 |

OTHER PUBLICATIONS

French Preliminary Search Report issued Mar. 28, 2012 in corresponding French Application No. 11 57401 filed Aug. 18, 2011 (with an English Translation of Categories).

* cited by examiner

*Primary Examiner* — Edward Look
*Assistant Examiner* — Aaron R Eastman
(74) *Attorney, Agent, or Firm* — Oblon, McClelland, Maier & Neustadt, L.L.P.

(57) ABSTRACT

A mechanical transmission device to driving in rotation counter-rotating propellers of a dual-propeller turboprop, including: an epicyclic gear train having a sun gear carried on a sun gear shaft centered on a longitudinal axis and which is connected upstream to a turbine rotor of the turboprop driven in rotation; at least one planet gear meshing with the sun gear; a planet gear carrier carrying the planet gear free to rotate and which is carried by a planet carrier shaft connected downstream to a first set of propellers to drive it in rotation; and a ring gear meshing with the planet gear and which is carried on a ring gear shaft connected downstream to a second set of propellers to drive it in rotation, is disclosed.

6 Claims, 3 Drawing Sheets

MECHANICAL TRANSMISSION DEVICE FOR DRIVING IN ROTATION COUNTER-ROTATING PROPELLERS OF A DUAL-PROPELLER TURBOPROP

BACKGROUND OF THE INVENTION

The present invention relates to the general field of turbo-propeller (turboprop) engines equipped with two counter-rotating propellers driven in rotation by means of a single turbine. It relates more particularly to a mechanical transmission device used between the turbine rotor shaft and the two shafts for driving the two propellers in rotation.

In known fashion, a dual-propeller aircraft turboprop includes two counter-rotating unshrouded fan blade sets. In certain dual-propeller turboprop architectures, these fan blade sets are driven in rotation by a power turbine having two counter-rotating rotors. In other architectures more particularly related to the present invention, the fan blade sets are driven by one and the same rotor of the power turbine. Reference can be made for example to document FR 2,942,203 which describes an example of implementation of such an architecture.

The counter-rotating propellers of such a turboprop can be driven in rotation directly or indirectly through a mechanical transmission device constituting a speed reducer and including in particular an epicyclic gear train. Generally, this epicyclic gear train comprises in particular a sun gear shaft which is centered on the longitudinal axis of the turboprop and which is connected upstream to the power turbine rotor to be driven thereby. Downstream, this sun gear carries the sun gear of the epicyclic gear train and transmits through gears its rotary motion to the two sets of fan blades of the turboprop.

In operation, the turboprop undergoes distortions which can extend to the mechanical transmission device. Now if these distortions reach the epicyclic gear train of the mechanical transmission device, they threaten to cause misalignment of the different planet gears which constitute it, which then brings about premature wear of the teeth of these planet gears.

OBJECT AND SUMMARY OF THE INVENTION

The present invention therefore has as its principal object to correct such disadvantages by proposing to increase the misalignment tolerance of the different elements of the epicyclic gear train when the turboprop undergoes distortion during operation.

This object is achieved thanks to a mechanical transmission device for driving in rotation counter-rotating propellers of a dual-propeller turboprop, including an epicyclic gear train having a sun gear carried by a sun gear which is centered on a longitudinal axis of the turboprop and which is designed to be connected upstream to a rotor of the turboprop to be driven in rotation, at least one planet gear meshing with the sun gear, a planet carrier carrying in rotation the planet gear which is carried by a planet carrier shaft designed to be connected downstream to a first set of set of propellers for driving it in rotation, and a ring gear meshing with the planet gear which is carried by a ring gear carrier designed to be connected downstream to a second set of propellers for driving it in rotation. Consistent with the invention, the sun gear shaft has an upstream end equipped with an upstream web extending radially outward, and a downstream end opposite to the upstream end and equipped with a downstream web formed downstream of the epicyclic gear train and extending radially outward.

The presence at both ends of the sun gear shaft of webs extending radially outward enables to shaft to be given great radial flexibility to allow it to absorb distortions undergone by the turboprop in operation. These webs are located on either side of the sun gear so as to maximize the distance between them. The misalignment tolerance of the different elements of the epicyclic gear train is thus strengthened. The danger of wear to the epicyclic gear train is thereby reduced.

As the webs are formed here at each end of the sun gear shaft, to wit at the connection of this shaft with the turbine rotor and downstream of the epicyclic gear train, there results a relative spacing between these two webs which further increases the attribute of obtaining high radial flexibility of the sun gear shaft.

Furthermore, in applying such a device to certain turboprop architectures, it is possible to eliminate a splined connection needed for mounting the sun gear shaft, which represents a mass and cost saving.

Preferably, the ratio of the diameter of the upstream and downstream webs of the sun gear shaft and the diameter of the sun gear shaft is comprised between 2 and 3.

The upstream web of the sun gear shaft can be attached to a roll-neck of the turbine rotor of the turboprop through a plurality of bolted connections. As for the downstream web of the sun gear shaft, it can include an annular portion assembled around the downstream end of the sun gear shaft by a system of splines.

In this case, this downstream web can be attached through a plurality of bolted connections onto a flange of the sun gear of the epicyclic gear train, said to flange of the sun gear having an annular portion surrounding the annular portion of the downstream web and a radial portion extending radially outward.

The invention also relates to a dual-propeller turboprop, comprising a first and a second propeller assembly driven in rotation by the rotor of a turbine through a mechanical transmission device as previously defined.

BRIEF DESCRIPTION OF THE DRAWINGS

Other features and advantages of the present invention will appear from the description given below, with reference to the appended drawings which illustrate an embodiment of it that is devoid of any limitation. In the figures.

DETAILED DESCRIPTION OF THE INVENTION

Figure 1:
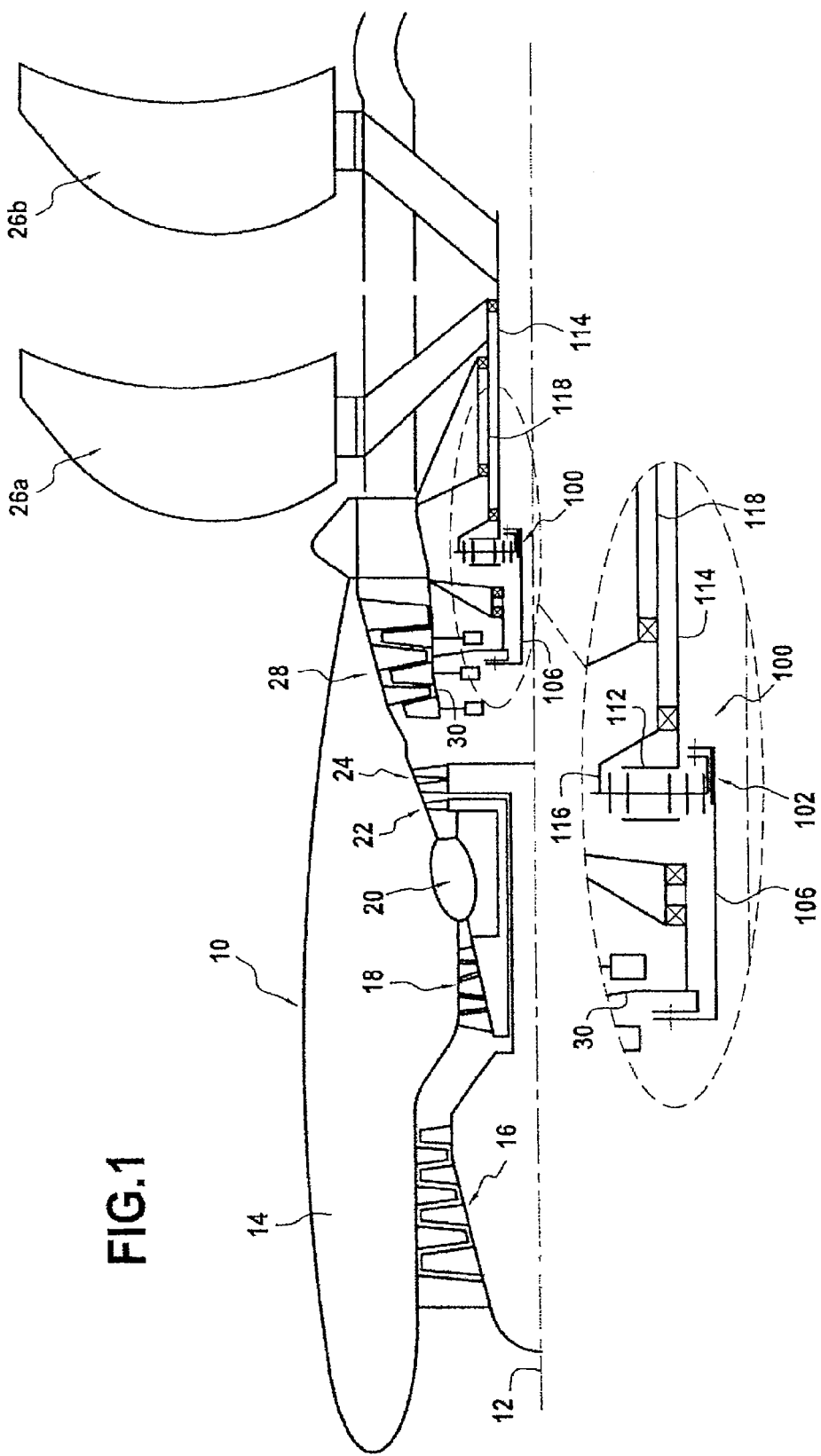
FIG. 1 is a schematic semi-sectional longitudinal view of a dual-propeller turboprop equipped with a mechanical transmission device consistent with the invention.

FIG. 1 shows very schematically an example of implementation of a dual-propeller type aircraft turboprop.

Such a turboprop is known and will therefore not be described in detail. The turboprop 10 includes in particular a longitudinal axis 12 and an annular nacelle 14 arranged coaxially around the longitudinal axis. The turboprop 10 also includes, from upstream to downstream, a low-pressure compressor 16, a high-pressure compressor 18, a combustion chamber 20, a high-pressure turbine 22 and an intermediate-pressure turbine 24.

Downstream of the intermediate-pressure turbine 24 is a system of counter-rotating propellers, to with an upstream (or forward) assembly 26a and a downstream (or rear) assembly 26b of variable-pitch fan blades.

This system of counter-rotating propellers is driven in rotation by means of a low-pressure turbine 28 located downstream of the intermediate-pressure turbine 24. This low-pressure turbine comprises in particular a rotor 30 which drives in rotation the two sets 26a, 26b of blades through a mechanical transmission device 100 described hereafter.

Figure 2:
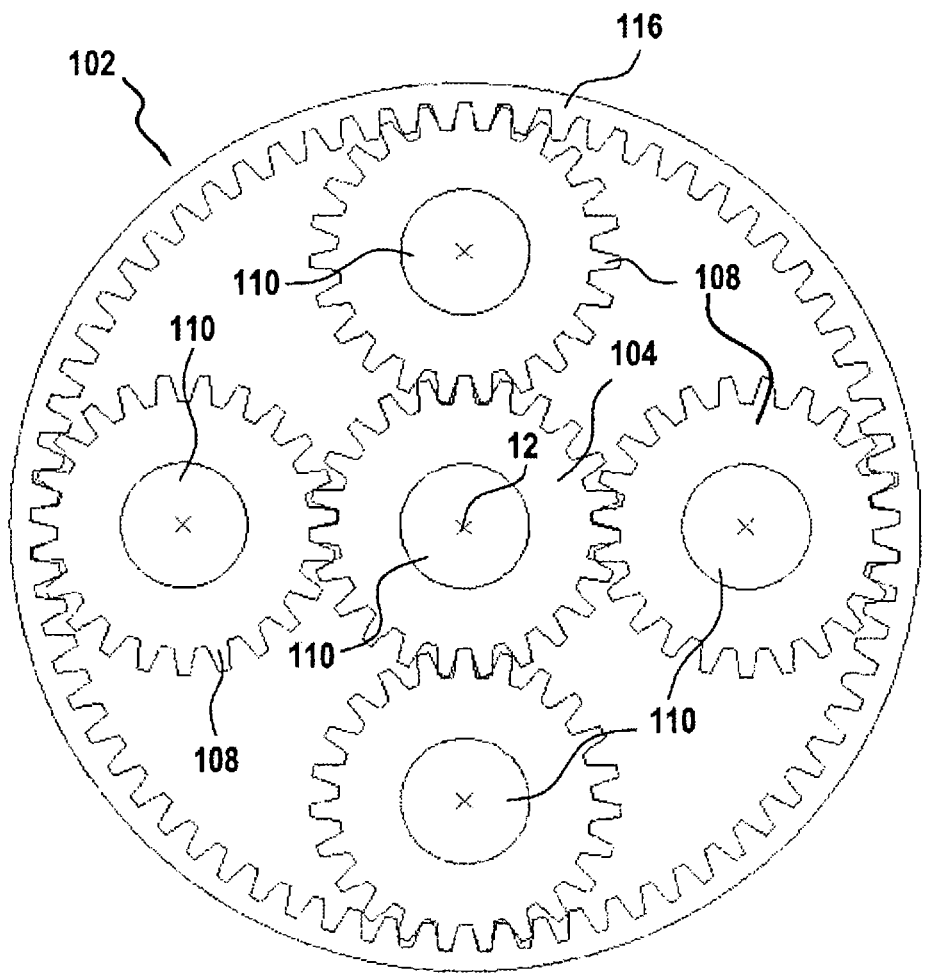
FIG. 2 shows schematically the epicyclic gear train of the mechanical transmission device of FIG. 1.

The mechanical transmission device 100 comprises an epicyclic gear train 102 shown in part in FIG. 2. This gear train is equipped in particular with a sun gear 104 which has the form of an externally toothed gear which is carried by a sun gear shaft 106. As shown in FIG. 1, this sun gear shaft 106 is centered on the longitudinal axis 12 of the turboprop and is connected upstream to the rotor 30 of the low-pressure turbine 28. Thus, the rotor of the low-pressure turbine directly drives in rotation the sun gear 106.

The epicyclic gear train also comprises at least one planet gear 108, and preferably several as shown in FIG. 2 (four in number), each planet gear having the form of an externally toothed gear meshing with the sun gear 106. Further, each planet gear 108 has an axis that is eccentric with respect to the longitudinal axis 12 and is carried by a planet shaft 110 having the same axis.

Figure 3:
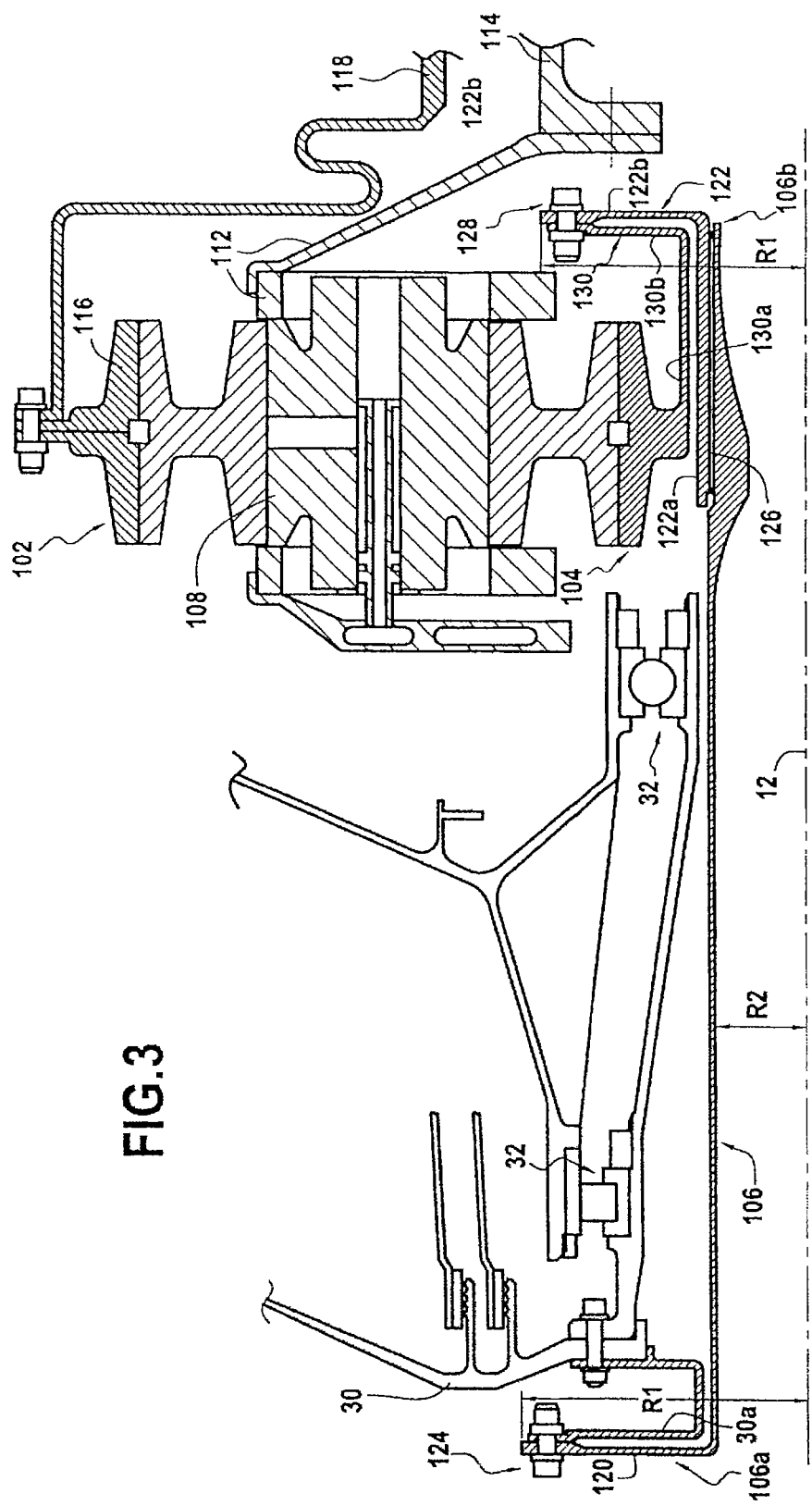
FIG. 3 is an enlarged view of FIG. 1 showing more precisely the mechanical transmission device.

As shown in FIG. 3, the epicyclic gear train also comprises a planet carrier 112 centered on the longitudinal axis 12 and carrying each of the planet gears 106, free to rotate, though the planet shafts. This planet carrier 112 is carried on a planet carrier shaft 114 having the same axis, this being attached downstream of the epicyclic gear train to the downstream blade assembly 26b so as to be able to directly drive it in rotation about the longitudinal axis 12.

Finally, the epicyclic gear train also comprises a ring gear 116 centered on the longitudinal axis 12 and meshing with each planet gear 108 through its internal teeth. This ring gear is carried by a ring gear carrier 118 having the same axis, this being attached downstream of the epicyclic gear train to the upstream blade assembly 26a so as to be able to drive it in rotation about the longitudinal axis 12.

In this manner, the rotor 30 of the low-pressure turbine drives in rotation the sun gear 106 of the epicyclic gear train 102, this rotary motion being transmitted both to the upstream 26a and downstream 26b blade assemblies to drive them in rotation in a counter-rotating fashion.

According to the invention, the sun gear shaft 106 of the epicyclic gear train 102 includes an upstream end 106a which is equipped with an upstream web 120 extending radially outward and a downstream end 106b opposite the upstream end and equipped with a downstream web 122 formed downstream of the epicyclic gear train and extending radially outward.

As shown in FIG. 3, the upstream web 120 of the sun gear shaft 106 is thus positioned upstream of the epicyclic gear train, while the downstream web 122 is formed downstream of it.

More precisely, the upstream web 120 of the sun gear shaft is attached to a radial roll-neck 30a connected to the low-pressure turbine through a plurality of bolted joints 124. In this manner, the upstream web 120 of the sun gear shaft and the roll-neck 30a of the rotor constitute a structure that allows the sun gear shaft 106 to deform radially under the influence of the radial mechanical loads which it might undergo in operation.

As for the downstream web 122 of the sun gear shaft, it can consist of a part independent of the sun gear shaft having an annular portion 122a assembled around the downstream end 106b of the sun gear shaft through a system of splines 126 and a radial portion 122b extending downstream the annular portion 122a and forming the downstream web, properly so called, by extending radially outward.

The radial portion 122b of the downstream web is then attached through a plurality of bolted connections 128 to a flange 130 of the sun gear 104 of the epicyclic gear train, said flange of the sun gear having an annular portion 130a located surrounding the annular portion 122a of the downstream web and a radial portion 130b extending radially outward.

In this manner, the downstream web 122 of the sun gear shaft and the flange 130 of the sun gear 104 constitute a structure allowing the sun gear shaft 106 to deform radially under the influence of radial mechanical forces which it might undergo during operation.

The presence of the upstream and downstream webs thus endows the sun gear shaft with a certain radial flexibility to allow it to absorb the deformations to which the turboprop is subject during operation.

It will be noted that such an arrangement of the downstream web, which is independent of the sun gear shaft, makes it possible to provide an upstream to downstream assembly of this sun gear shaft on the epicyclic gear train, the downstream web then being assembled onto the sun gear shaft by being brought from downstream to upstream. Once the sun gear shaft and its webs are assembled, they are fixed by means of the bolted connections 124, 128.

It will also be noted that with such a configuration and disposition of the upstream and downstream webs of the sun gear shaft, it is possible to eliminate all splined connections between the sun gear shaft 106 and the roll-neck 30a of the rotor 30 of the low-pressure turbine which would have been necessary for mounting the sun gear shaft.

Moreover, the placement of the downstream web 122 of the sun gear shaft of the epicyclic gear train exhibits numerous advantages. In particular, it makes it possible to achieve maximum spacing between the two webs of the sun gear shaft and thus to increase their ability to confer great radial mechanical flexibility to that shaft. In addition, it makes it possible to increase the distance separating the two ball bearings 32 shown in FIG. 3 and bearing in rotation the rotor 30 of the low-pressure turbine, which increases their effectiveness.

Preferably, the ratio of the diameter of the upstream and downstream webs 120, 122 of the sun gear shaft and the diameter of the sun gear shaft 106 is comprised between 2 and 3. In FIG. 3 are shown the radius R1 of the upstream and downstream webs and the radius R2 of the sun gear shaft. The ratio R1/R2 is thus comprised between 2 and 3.

The invention claimed is:

1. A mechanical transmission device for driving in rotation counter-rotating propellers of a dual-propeller turboprop, including an epicyclic gear train comprising:

a sun gear carried by a sun gear shaft which is centered on the longitudinal axis of the turboprop and which is designed to be connected upstream to a rotor of a turbine of the turboprop to be driven in rotation;

at least one planet gear meshing with the sun gear;

a planet carrier carrying, free to rotate, the planet gear and which is carried by a planet carrier shaft designed to be connected downstream to a first set of propellers to drive the first set of propellers in rotation; and a ring gear meshing with the satellite and which is carried on a ring gear shaft designed to be connected downstream to a second set of propellers to drive the second set of propellers in rotation;

wherein the sun gear shaft includes an upstream end provided with an upstream web extending radially outward, and a downstream end opposite the upstream end and provided with a downstream web formed downstream of the epicyclic gear train and extending radially outward.

2. The device according to claim 1, wherein the ratio of the diameter of the upstream and downstream webs of the sun gear shaft and the diameter of the sun gear shaft is comprised between 2 and 3.

3. The device according to 1, wherein the upstream web of the sun gear shaft is attached to a roll-neck of the turbine rotor of the turboprop through a plurality of bolted joints.

4. The device according to claim 1, wherein the downstream web of the sun gear shaft includes an annular portion mounted surrounding the downstream end of the sun gear shaft via a system of splines.

5. The device according to claim 4, wherein the downstream web of the sun gear shaft is fixed through a plurality of bolted connections to a flange of the sun gear of the epicyclic gear train, said sun gear flange having an annular portion arranged surrounding the annular portion of the downstream web and a radial portion extending radially outward.

6. A dual-propeller turboprop, comprising a first and a second set of propellers driven in rotation by the rotor of a turbine through a mechanical transmission device according to claim 1.

* * * * *